(12) United States Patent
Ichikawa

(10) Patent No.: US 7,678,439 B2
(45) Date of Patent: Mar. 16, 2010

(54) HONEYCOMB STRUCTURE AND DIE FOR FORMING HONEYCOMB STRUCTURE

(75) Inventor: Yukihito Ichikawa, Nagoya (JP)

(73) Assignee: NGK Insulators, Inc., Nagoya (JP)

( * ) Notice: Subject to any disclaimer, the term of this patent is extended or adjusted under 35 U.S.C. 154(b) by 1224 days.

(21) Appl. No.: 10/525,830

(22) PCT Filed: Sep. 4, 2003

(86) PCT No.: PCT/JP03/11310

§ 371 (c)(1),
(2), (4) Date: Jun. 16, 2005

(87) PCT Pub. No.: WO2004/026472

PCT Pub. Date: Apr. 1, 2004

(65) Prior Publication Data

US 2005/0241266 A1    Nov. 3, 2005

(30) Foreign Application Priority Data

Sep. 5, 2002    (JP) .............................. 2002-260545

(51) Int. Cl.
*B32B 3/12*    (2006.01)
(52) U.S. Cl. ...................... 428/116; 428/117
(58) Field of Classification Search ................ 428/116, 428/117; 246/601, 630; 55/282.3, 523; 422/177, 422/180; 52/783.1
See application file for complete search history.

(56) References Cited

U.S. PATENT DOCUMENTS

| 3,853,485 | A | | 12/1974 | Hogan |
|---|---|---|---|---|
| 4,329,162 | A | * | 5/1982 | Pitcher, Jr. .................... 55/523 |
| 4,519,820 | A | | 5/1985 | Oyobe et al. |
| 4,722,819 | A | | 2/1988 | Lundsager |
| 4,902,216 | A | | 2/1990 | Cunningham et al. |
| 5,008,509 | A | | 4/1991 | Hattori et al. |
| 5,393,587 | A | | 2/1995 | Machida et al. |
| 5,456,965 | A | | 10/1995 | Machida et al. |
| 5,487,863 | A | | 1/1996 | Cunningham et al. |
| 5,514,446 | A | * | 5/1996 | Machida et al. ............. 428/116 |
| 7,276,101 | B2 | * | 10/2007 | Ichikawa ...................... 55/523 |
| 7,429,416 | B2 | * | 9/2008 | Hirakawa et al. ........... 428/116 |
| 2004/0123573 | A1 | | 7/2004 | Ichikawa et al. |

FOREIGN PATENT DOCUMENTS

| EP | 0 290 632 A1 | 11/1988 |
|---|---|---|
| EP | 0 389 221 A1 | 9/1990 |
| EP | 0 824 183 A2 | 2/1998 |
| EP | 1 384 507 A2 | 1/2004 |
| JP | 54-87763 | 7/1979 |

(Continued)

*Primary Examiner*—Richard E Chilcot, Jr.
*Assistant Examiner*—Chi Q Nguyen
(74) *Attorney, Agent, or Firm*—Oliff & Berridge PLC

(57) ABSTRACT

A honeycomb structure has a cell structure section 3 an outer circumferential wall section 4. The cell structure section 3 includes a first partition wall group having partition walls 1*a* positioned in parallel and a second partition wall group having partition walls 1*b* which intersect the partition walls of the first partition wall group at right angles and are positioned in parallel. In this honeycomb structure, the partition wall intervals of the partition walls 1*a* and 1*b* of each partition wall group positioned in parallel are varied stepwise in at least a part of the cell structure section 3, and all the partition walls 1*a* and 1*b* have such a ratio of the cell side length to the partition wall thickness that the partition wall can withstand pressure during canning. The honeycomb structure has increased isostatic strength and thermal shock resistance and can be manufactured at low cost.

12 Claims, 11 Drawing Sheets

FOREIGN PATENT DOCUMENTS

| | | |
|---|---|---|
| JP | A 55-155742 | 12/1980 |
| JP | A 57-019039 | 2/1982 |
| JP | A 57-110314 | 7/1982 |
| JP | U 59-47310 | 3/1984 |
| JP | A 60-78707 | 5/1985 |
| JP | U 60-145216 | 9/1985 |
| JP | 60-147711 | 10/1985 |
| JP | A 61-47135 | 3/1986 |
| JP | 61-129016 | 6/1986 |
| JP | 62-027044 | 2/1987 |
| JP | A 62-114633 | 5/1987 |
| JP | U 62-163697 | 10/1987 |
| JP | A 09-158720 | 6/1997 |
| JP | 09-290413 | 11/1997 |

* cited by examiner

HONEYCOMB STRUCTURE AND DIE FOR FORMING HONEYCOMB STRUCTURE

TECHNICAL FIELD

The present invention relates to a honeycomb structure and a die. More particularly, the present invention relates to a honeycomb structure provided with improved characteristics as a catalyst body, a filter, or the like by varying the partition wall intervals and a die therefore.

BACKGROUND ART

In recent years, various attempts have been made to improve purification performance of a honeycomb structure used as an exhaust gas purification catalyst body, filter, adsorbent, or the like in order to deal with tightened exhaust gas regulations.

For example, attempts have been made to enable a honeycomb structure used as a catalyst body to exhibit a desired exhaust gas purification performance immediately after starting an engine by rapidly increasing the catalyst temperature to increase catalytic activity by reducing the thickness of the partition wall to reduce heat capacity. Attempts have also been extensively made to increase the porosity of the partition wall of a honeycomb structure used as a filter or the like in order to increase collection efficiency or the like.

The above honeycomb structure is held on the outer circumference surface and disposed in a casing. However, since the honeycomb structure is placed at a position, near an engine, at which the honeycomb structure is continuously subjected to a large amount of vibration, the honeycomb structure must be securely held so that it is not removed due to vibration (clamshell, stuffing, tourniquet, swaging, or the like is used as the holding method (canning method)).

The honeycomb structure is used under high-temperature environment in which high-temperature exhaust gas is blown against the honeycomb structure. In the case of using the honeycomb structure as a filter, the honeycomb structure is subjected to a high-temperature regeneration treatment when a predetermined amount of soot has been deposited. Therefore, it is also important that the honeycomb structure have high isostatic strength and thermal shock resistance.

However, the above-mentioned progress of a decrease in thickness and an increase in porosity causes a decrease in isostatic strength and thermal shock resistance of the honeycomb structure, thereby causing damage to the partition wall as another problem. Therefore, a honeycomb structure having high isostatic strength and thermal shock resistance while satisfying a demand for an increase in purification performance has been demanded.

In view of the above-described situation, JP61-47135B, JP60-78707A, JP62-114633A, and JP10-180915A disclose a "honeycomb structure and the like including cells having a rectangular cross-sectional shape" as a conventional honeycomb structure.

However, since the cells of the honeycomb structure are provided at a uniform cell density in order to improve the thermal shock resistance or the heat exchange ratio, these honeycomb structures do not exhibit sufficient isostatic strength under practical environment in which vibration is continuously applied. Therefore, these honeycomb structures cannot withstand long-term use.

JP57-110314A, JP-U59-47310A, and JP-A-55-155742 disclose a honeycomb structure and the like including a low-cell-density region and a high-cell-density region.

However, since these honeycomb structures and the like merely aim at making the exhaust gas flow rate uniform, sufficient characteristics cannot be obtained for thermal shock resistance.

Specifically, since the partition walls of the high-cell-density region and the low-cell-density region are intricately bonded in these honeycomb structures and the like at the boundary between the high-cell-density region and the low-cell-density region, stress caused by thermal shock tends to be concentrated at such a boundary of the honeycomb structure. Therefore, these honeycomb structures and the like exhibit insufficient thermal shock resistance under high-temperature environment such as during the regeneration treatment when used as a filter due to damage to the partition wall or the like. Moreover, since it is very difficult to manufacture a die corresponding to the complex shape at the boundary, these honeycomb structures and the like are rarely used in practical application.

JP-U60-145216A discloses a "catalytic converter in which cells having a trapezoidal cross-sectional shape are provided in a state in which the open area of each cell is increased stepwise from the center section toward the outer circumference", JP-U62-1 63697A discloses a "honeycomb structure in which triangular cells formed by providing a partition wall which connects opposite angles of a square cell are provided near the outer circumference of the honeycomb structure", and U.S. Pat. No. 3,853,485 discloses a "honeycomb structure in which the number of partition walls provided between two opposite sides of an octagonal cell is increased stepwise from the outer circumferential section toward the center section of the honeycomb structure".

However, since the partition walls of these honeycomb structures have a complicated bent structure, it is very difficult to manufacture a die for forming these honeycomb structures, whereby cost of the resulting honeycomb structure is increased to a large extent. Therefore, these honeycomb structures are rarely used.

JP-U60-147711A discloses a "honeycomb structure in which all cells have a tetragonal cross-sectional shape and the sizes of the cells are gradually increased from the center section toward the outside", and JP9-158720A discloses a "honeycomb structure in which a plurality of flow straightening plates are disposed in the shape of a lattice so that the intervals between the plates are decreased from the center section to the peripheral section of the casing".

However, since the sizes of the cells are varied at a high ratio over the entire region in order to control the exhaust flow rate distribution or the like, the flattening ratio (long side length/short side length) of the cell is increased. Moreover, the ratio of the cell side length to the partition wall thickness is not taken into consideration. Therefore, a honeycomb structure having thin partition walls cannot be properly subjected to canning due to extremely low isostatic strength.

As a die used to manufacture a honeycomb structure in which the partition wall intervals are varied, a die in which holes having the same inner diameter and the same material path length are provided at equal intervals at intersections has been used in the same manner as in the case of manufacturing a honeycomb structure in which the partition walls are provided at equal intervals (JP 60-78707A). However, in a die used to manufacture a honeycomb structure in which the partition wall intervals are varied, open slit areas per unit cell pitch also differ corresponding to the change in the partition wall interval. Therefore, if holes having the same inner diameter and the same material path length are provided to each cell pitch, the raw material extrusion speed is increased in the area in which the slit interval is small and the raw material extrusion speed is decreased in the area in which the slit interval is large, whereby a forming failure of the resulting honeycomb structure tends to occur.

DISCLOSURE OF THE INVENTION

The present invention has been achieved in view of the above-described problems. The present invention aims at providing a honeycomb structure which excels in isostatic strength and thermal shock resistance and has such a high industrial applicability that the honeycomb structure can be manufactured at low cost, and a die for forming a honeycomb structure which enables the honeycomb structure to be manufactured without causing a forming failure.

The present invention has been made for the above issues, and provides a honeycomb structure, comprising: a cell structure section including a plurality of cells partitioned by a plurality of partition walls; and an outer circumferential wall section surrounding the cell structure section; wherein the cell structure section includes a first partition wall group having the partition walls positioned in parallel, and a second partition wall group having the partition walls which intersect the partition walls of the first partition wall group at right angles and are positioned in parallel, each of the partition walls connecting two different locations of the outer circumferential wall section though one continuous plane; wherein partition wall intervals of each of the partition wall groups positioned in parallel are varied stepwise in at least a part of the cell structure section, and at least some of the cells have a rectangular cross-sectional shape; and wherein all the partition walls have such a ratio of a cell side length to a partition wall thickness that the partition wall can withstand pressure during canning.

The "partition wall interval" used herein means the distance from the center (in a partition wall thickness direction) of one partition wall to the center (in a partition wall thickness direction) of the adjacent partition wall. The expression "partition wall intervals are varied stepwise" used herein means that the partition wall interval of the first partition wall group or the second partition wall group is gradually changed. However, the number of steps of changes is not particularly limited, and the number of steps of changes may be one in addition to two or more.

In the present invention, it is preferable that a square of a ratio of the cell side length to the partition wall thickness ((cell side length/partition wall thickness)$^2$) of the partition walls of the cell structure section be 1,000 or less. It is preferable that at least some of the cells in the cell structure section have a rectangular cross-sectional shape. In this case, it is preferable that a flattening ratio (long side length/short side length) of the cells be 2.0 or less.

In the present invention, the partition wall intervals of the partition walls of the first partition wall group may be varied at a different pattern or size relative to the partition wall intervals of the partition walls of the second partition wall group. However, it is preferable that the partition wall intervals be varied geometrically or arithmetically in the region in which the partition wall intervals are varied stepwise. It is preferable that a partition wall interval variation ratio (| next partition wall interval—reference partition wall interval |/reference partition wall interval) be 0.5 or less in the region in which the partition wall intervals are varied stepwise.

In the present invention, materials for forming the partition wall and the outer circumferential wall are not particularly limited. For example, a metal material, or at least one ceramic material selected from the group consisting of cordierite, alumina, mullite, lithium aluminum silicate, aluminum titanate, titania, zirconia, silicon nitride, aluminum nitride, and silicon carbide, or at least one adsorbent material such as activated carbon, silica gel, or zeolite can be given. As the shape of the honeycomb structure, a honeycomb structure of which the cross-sectional shape perpendicular to the axial direction is circular, elliptical, oval, or a non-symmetrical irregular shape can be given, for example.

In the present invention, a honeycomb filter may be formed by alternately plugging the cells of the above honeycomb structure on either end face of the cells using a plugging material. A catalyst body may be formed by loading a catalyst on the surface of the partition wall and/or inside of the partition wall (surface of the pore inside the partition wall) of the honeycomb structure, and an adsorbent may be formed by loading a catalyst component and an adsorbent component on the surface of the partition wall and/or inside of the partition wall of the honeycomb structure.

An exhaust gas purification converter may be formed by holding the honeycomb structure, the honeycomb filter, the catalyst body, or the adsorbent in a casing, and providing an exhaust gas introduction tube for introducing exhaust gas into the honeycomb structure, for example.

As a die for forming a honeycomb structure suitably used to manufacture the above honeycomb structure, the present invention also provides a die for forming a honeycomb structure (hereinafter may be simply referred to as "die"), the die comprising: lattice-shaped slits which are open on one face of a die substrate; and a plurality of holes which are open on an opposite face of the die substrate, each of the holes introducing a raw material into a specific region of the lattice-shaped slits; wherein open slit areas per unit lattice are varied stepwise in at least some of the lattice-shaped slits; the die including a structure which varies flow rates of the raw material introduced into regions having different open slit areas per unit lattice at a ratio substantially equal to a variation ratio of the open slit areas.

In the present invention, as the structure which varies the flow rates of the raw material introduced into the regions, a structure in which at least one of intervals of the holes, inner diameters of the holes, and raw material path lengths of the holes is varied is preferable.

In the case of forming a die comprising lattice-shaped slits which are open on one face of a die substrate, and a plurality of holes which are open on an opposite face of the die substrate, the holes communicating with intersections of the lattice-shaped slits, it is preferable that open slit areas around the intersections of the lattice-shaped slits be varied stepwise in at least some of the lattice-shaped slits, and that the die include a structure which, at a ratio substantially equal to a variation ratio of an open slit area around a next intersection adjacent to one intersection of the lattice-shaped slits to an open slit area around the one intersection (next intersection/one intersection), varies a flow rate of the raw material introduced into the next intersection from a flow rate of the raw material introduced into the one intersection. As the structure which varies the flow rate of the raw material introduced into the next intersection, a structure in which at least one of intervals of the holes, inner diameters of the holes, and raw material path lengths of the holes is varied is preferable. In addition, a structure in which all of these are varied is also preferable.

BEST MODE FOR CARRYING OUT THE INVENTION

Embodiments of the present invention are described below in detail with reference to the drawings.

Figure 1A:
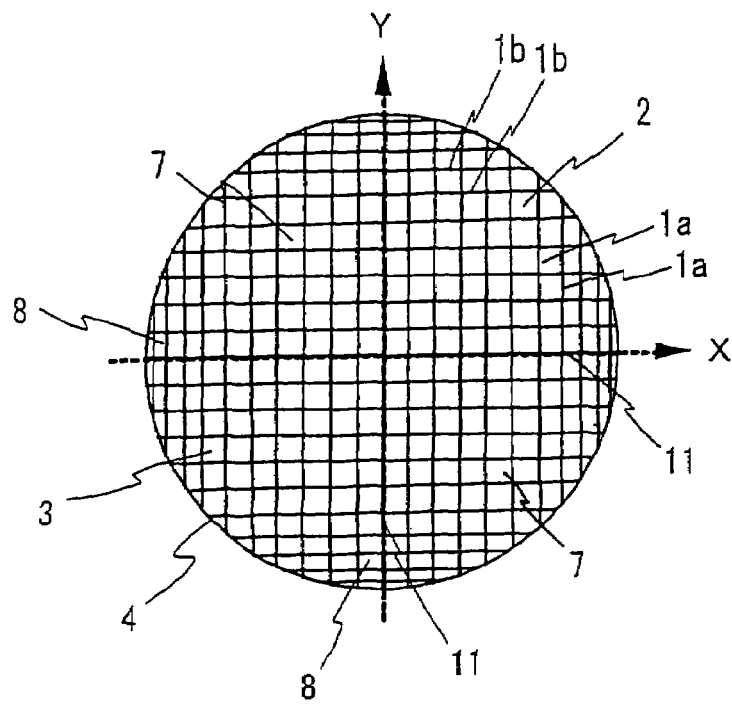
FIG. 1(a) is a cross-sectional view schematically showing an embodiment of a honeycomb structure of the present invention.
Figure 1B:
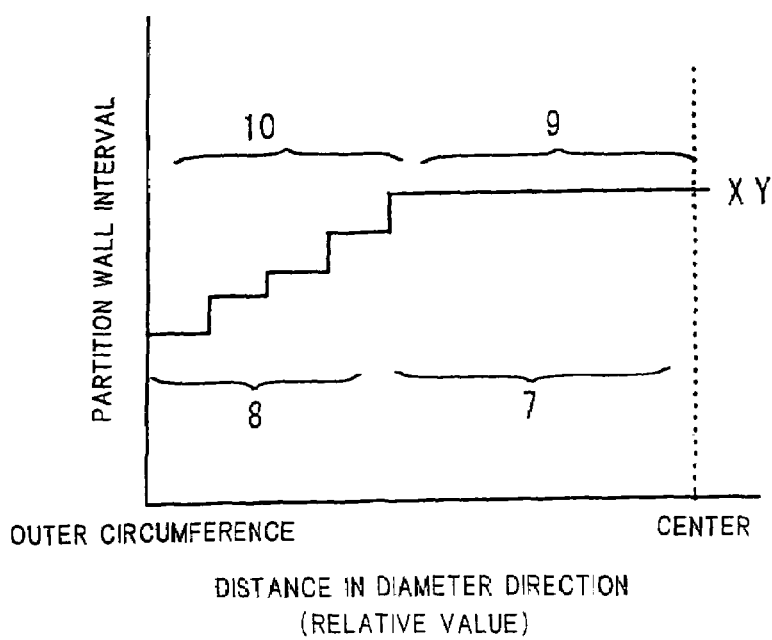
FIG. 1(b) is a graph showing a pattern of partition wall intervals.

As shown in FIG. 1(a), a honeycomb structure of the present invention includes a cell structure section 3 including a plurality of cells 2 partitioned by a plurality of partition walls 1a and 1b, and an outer circumferential wall section 4 surrounding the cell structure section 3. In the present invention, as shown in FIGS. 1(a) to 9(b), the cell structure section 3 has a structure in which the partition wall 1 connects two different locations of the outer circumferential wall section 4 through one continuous plane, and includes a first partition wall group having the partition walls 1a positioned in parallel (hereinafter simply referred to as "first partition wall group") and a second partition wall group having the partition walls 1b which intersect the partition walls of the first partition wall group at right angles and are positioned in parallel (hereinafter simply referred to as "second partition wall group"), in which all the partition walls preferably belong to either the first partition wall group or the second partition wall group (the extending direction of the partition walls 1a of the first partition wall group is indicated by X and the extending direction of the partition walls 1b of the second the partition wall group is indicated by Y in each drawing).

Therefore, stress caused by thermal shock is not concentrated at a specific location differing from a honeycomb structure having a structure in which the partition walls are complicatedly bent or intricate, whereby a honeycomb structure having high thermal shock resistance can be obtained. Moreover, such a simple structure allows a die for forming the honeycomb structure to have a simple structure in which each slit for forming the partition wall has continuous linearity, whereby expensive slit processing can be facilitated and slit processing accuracy can be improved. Therefore, cost of the honeycomb structure can be reduced, and formability of the honeycomb structure can be improved.

In the present invention, the partition wall intervals of the partition walls 1a and 1b of each partition wall group positioned in parallel are varied stepwise in at least a part of the cell structure section 3, and at least some of the cells 2 partitioned by the partition walls 1a and 1b of each partition wall group have a rectangular cross-sectional shape.

Therefore, higher thermal shock resistance can be obtained while securing desired purification performance corresponding to the use mode, and reactivity with exhaust gas is improved due to an increase in the Nusselt number (Nu), thereby contributing to improvement of purification performance.

The present invention is described below in detail.

In the present invention, the partition wall intervals may be varied corresponding to the shape of the honeycomb structure, use mode, required performance, and the like. The partition wall intervals of the first partition wall group and the second partition wall group may be varied at different patterns and/or sizes or at the same pattern and/or size from a center axis position C toward the outer circumference.

Figure 6A:
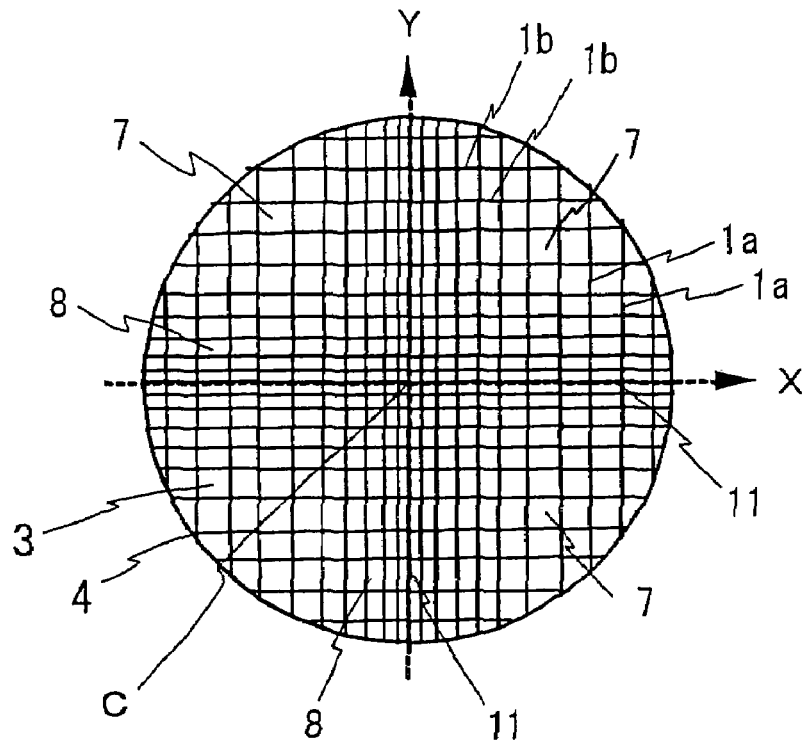
FIG. 6(a) is a cross-sectional view schematically showing another embodiment of a honeycomb structure of the present invention.
Figure 6B:
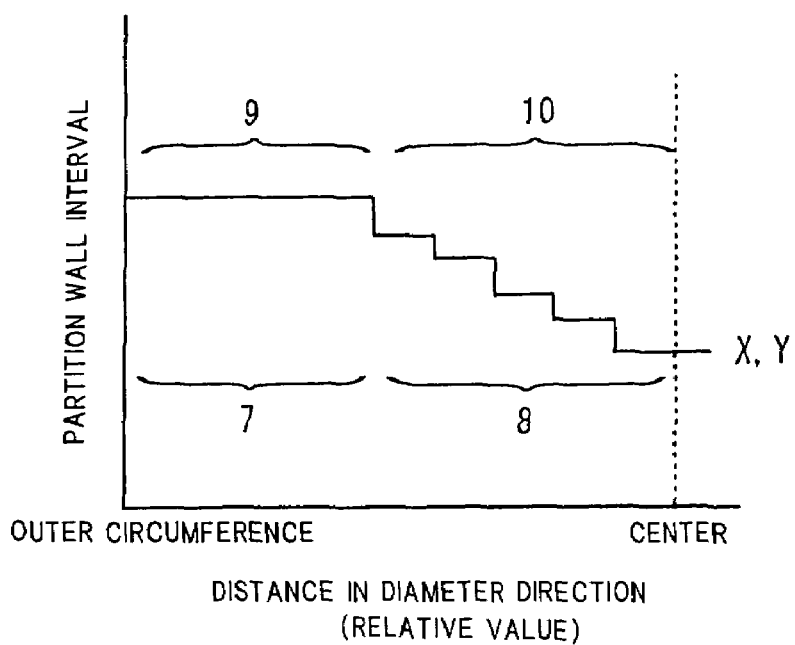
FIG. 6(b) is a graph showing a pattern of partition wall intervals.
Figure 7A:
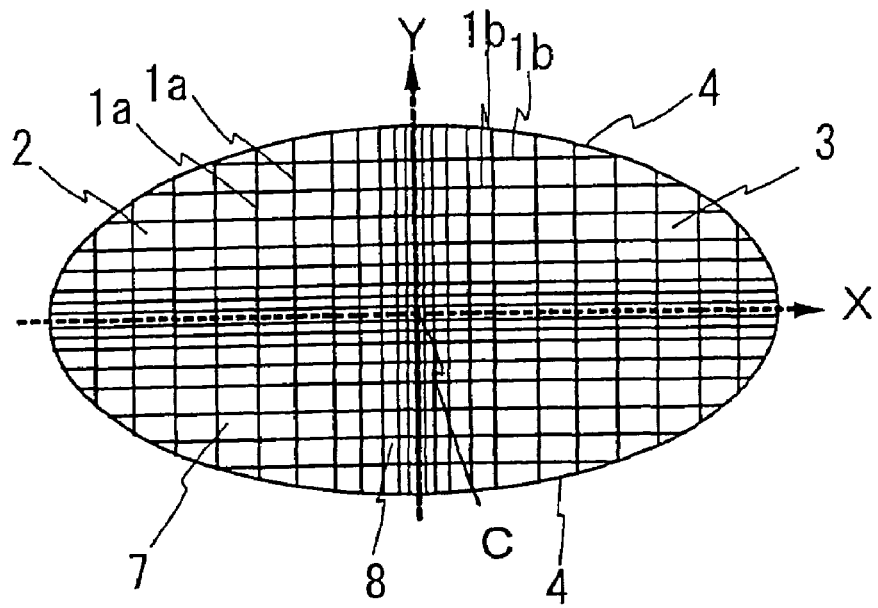
FIG. 7(a) is a cross-sectional view schematically showing another embodiment of a honeycomb structure of the present invention.
Figure 7B:
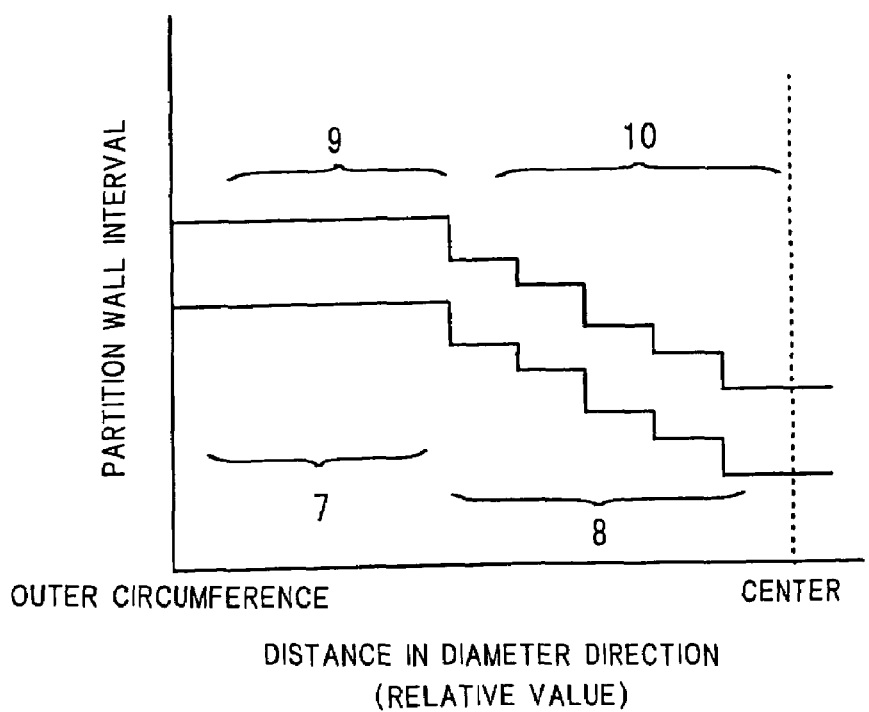
FIG. 7(b) is a graph showing a pattern of partition wall intervals.
Figure 8A:
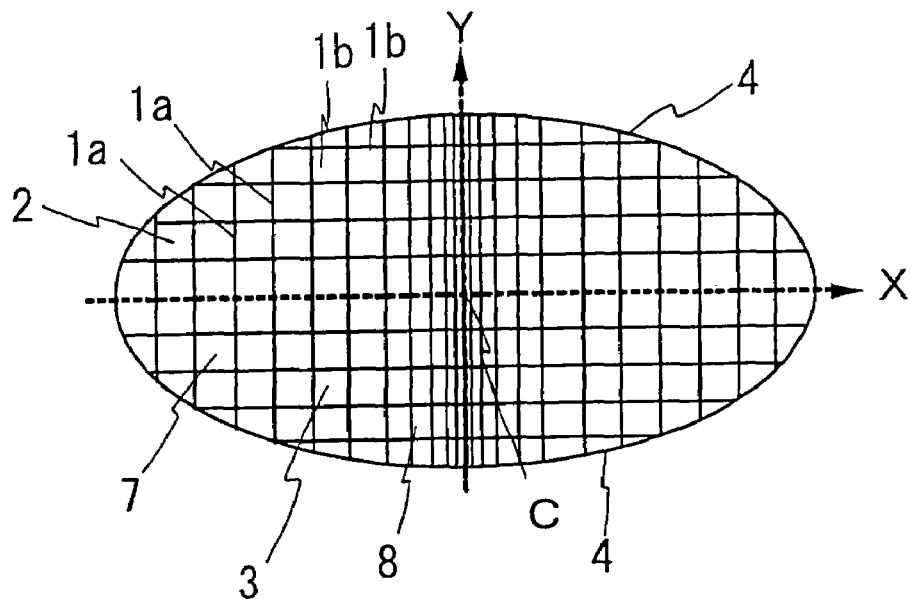
FIG. 8(a) is a cross-sectional view schematically showing another embodiment of a honeycomb structure of the present invention.
Figure 8B:
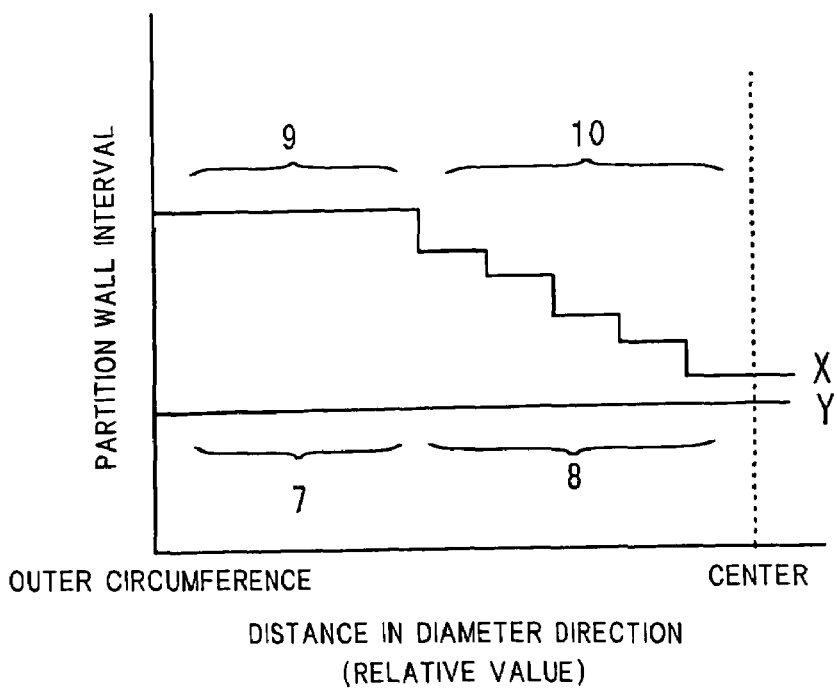
FIG. 8(b) is a graph showing a pattern of partition wall intervals.
Figure 9A:
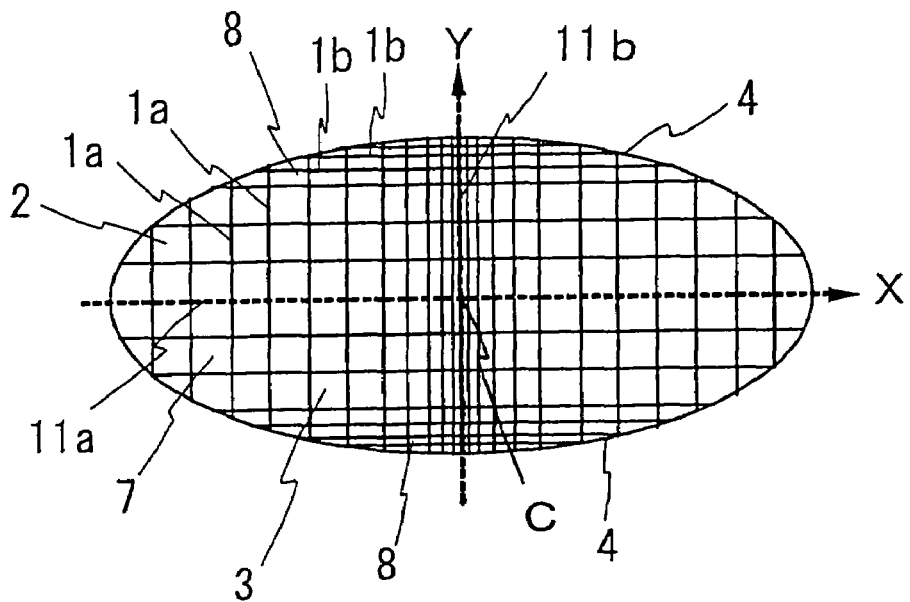
FIG. 9(a) is a cross-sectional view schematically showing yet another embodiment of a honeycomb structure of the present invention.
Figure 9B:
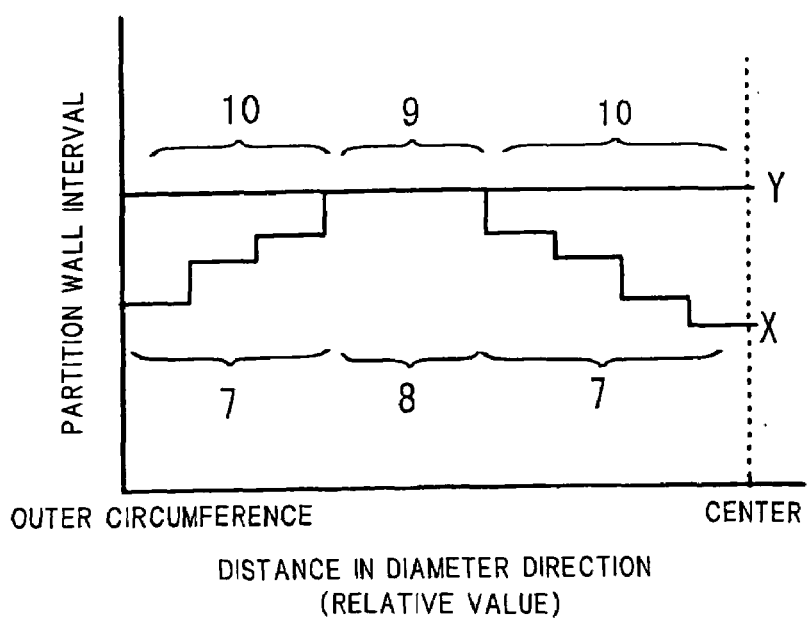
FIG. 9(b) is a graph showing a pattern of partition wall intervals.

In more detail, a honeycomb structure as shown in FIGS. 6(a) and 6(b) in which the partition wall intervals of the partition walls 1a of the first partition wall group and the partition walls 1b of the second partition wall group are varied at the same pattern and size from the center axis position C toward the outer circumference; a honeycomb structure as shown in FIGS. 3(a) and 3(b) and FIGS. 8(a) and 8(b) in which the partition wall intervals of either the partition walls 1a of the first partition wall group or the partition walls 1b of the second partition wall group are varied from the center axis position C toward the outer circumference, and the partition wall intervals of the other partition walls are not varied; a honeycomb structure as shown in FIGS. 7(a) and 7(b) in which the partition wall intervals of the partition walls 1a of the first partition wall group and the partition walls 1b of the second partition wall group are varied at the same pattern and different sizes from the center axis position C toward the outer circumference; a honeycomb structure as shown in FIGS. 9(a) and 9(b) in which the partition wall intervals of the partition walls 1a of the first partition wall group and the partition walls 1b of the second partition wall group are varied at different patterns and sizes from the center axis position C toward the outer circumference; and the like can be given.

In order to increase the number of cells 2 having a rectangular cross-sectional shape to improve thermal shock resistance of the honeycomb structure or the like, a honeycomb structure as shown in FIGS. 7(a) and 9(a) in which the partition wall intervals of the partition walls 1a of the first partition wall group and the partition walls 1b of the second partition wall group are varied at least at different patterns or sizes from the center axis position C toward the outer circumference is preferable. However, it is also preferable to provide regular square cells in order to improve bending strength of the cell structure section 3 to increase the isostatic strength of the honeycomb structure. In this case, the partition wall intervals of the partition walls 1*a* of the first partition wall group and the partition walls 1*b* of the second partition wall group may be varied at the same pattern and the same size in a part of the region from the center axis position C toward the outer circumference.

In the case of a honeycomb structure which is used in a state in which an extremely large amount of vibration is applied, such as at a location right under an exhaust manifold, and for which high isostatic strength is particularly required, high isostatic strength can be obtained while securing desired exhaust gas purification performance and impact resistance by increasing the intervals ("greater than the average partition wall interval"; hereinafter the same) of the partition walls extending through at least a part of a center section of the honeycomb structure (section of the honeycomb structure which occupies a region from the center axis position to the midpoint of the radius toward the outer circumference) to provide a low-cell-density region ("region having a cell density lower than the average cell density"; hereinafter the same) 7 at the center section, and decreasing the intervals ("smaller than the average partition wall interval"; hereinafter the same) of the partition walls extending through at least a part of an outer circumference section of the honeycomb structure (section of the honeycomb structure which occupies a region from the outer circumference to the midpoint of the radius toward the inside) to provide a high-cell-density region ("region having a cell density higher than the average cell density"; hereinafter the same) 8, as shown in FIGS. 1(*a*) and 1(*b*) to FIG. 5.

In the case of a honeycomb structure for which improvement of purification performance is particularly required by making the exhaust gas flow uniform in addition to high isostatic strength, a high exhaust gas purification performance can be obtained while securing desired isostatic strength and shock resistance by decreasing the intervals of some of the partition walls extending through the outer circumferential section and the center section to provide the high-cell-density region 8 to include a part of the outer circumferential section and the center section, and increasing the partition wall intervals extending through the remaining section to provide the low-cell-density region 7 in the remaining section, as shown in FIGS. 6 to 9.

Figure 2A:
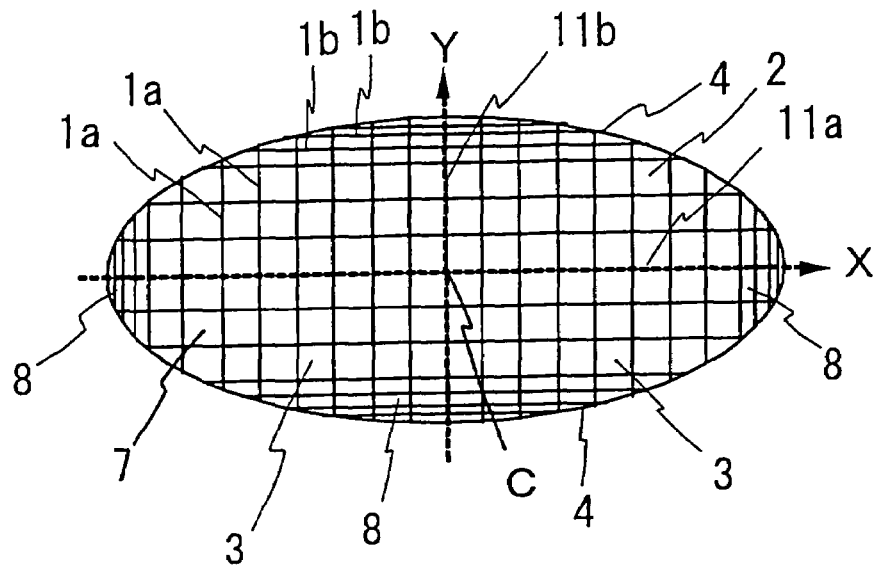
FIG. 2(a) is a cross-sectional view schematically showing another embodiment of a honeycomb structure of the present invention.
Figure 2B:
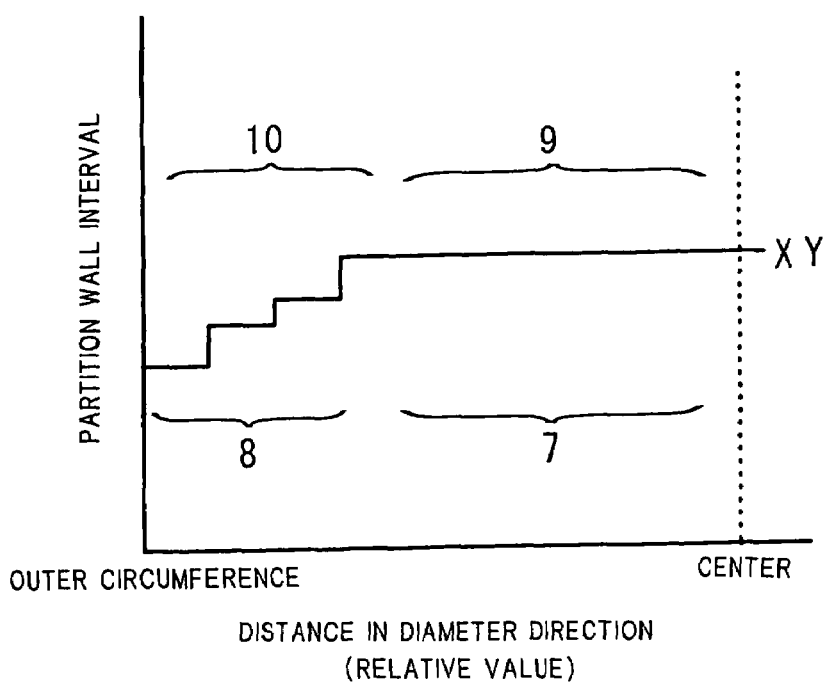
FIG. 2(b) is a graph showing a pattern of partition wall intervals.
Figure 3A:
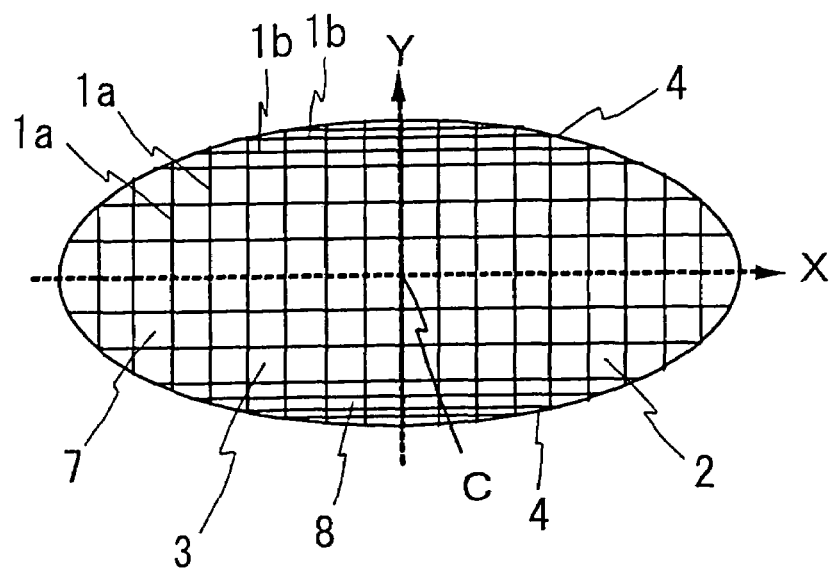
FIG. 3(a) is a cross-sectional view schematically showing still another embodiment of a honeycomb structure of the present invention.
Figure 3B:
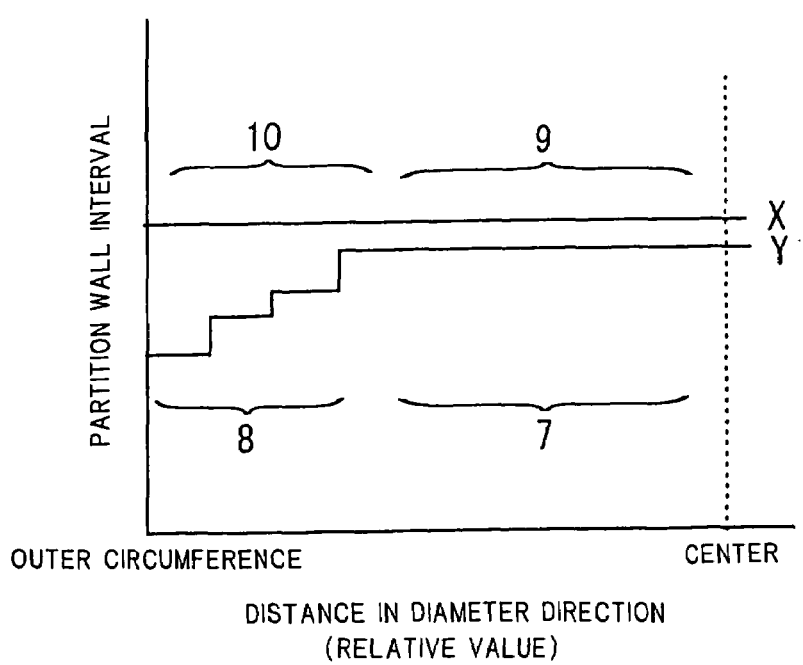
FIG. 3(b) is a graph showing a pattern of partition wall intervals.

As a honeycomb structure of a type in which isostatic strength is important, a honeycomb structure in which the partition walls 1*a* and 1*b* of the first partition wall group and the second partition wall group are disposed at large intervals near diameter positions 11 (major axis position 11*a* and minor axis position 11*b*), and the partition walls 1*a* and 1*b* are disposed near the outer circumferential wall section 4 while decreasing the intervals stepwise toward the outer circumference to provide the high-cell-density region 8 in the outer circumferential section and to provide the low-cell-density region 7 in the center section, as shown in FIGS. 1(*a*) and 1(*b*) or FIGS. 2(*a*) and 2(*b*), can be given as a typical example.

As a honeycomb structure of the same type, a honeycomb structure having an elliptical cross-sectional shape as shown in FIG. 3 can be given in which the partition wall intervals of the partition walls of the second partition wall group 6 arranged from the outer circumference having a large radius of curvature toward the major axis position 11*a* are increased near the major axis position 11*a* and are decreased stepwise near the outer circumferential wall section 4 toward the outer circumference, and the partition walls 1*a* of the first partition wall group 5 disposed to intersect the partition walls of the second partition wall group at right angles are disposed at equal intervals over the entire region to provide the high-cell-density region 8 near the outer circumference having a large radius of curvature and to provide the low-cell-density region 7 in the remaining region. In this honeycomb structure, since the high-cell-density region is concentrated near the outer circumference having a large radius of curvature at which the external pressure during canning tends to be increased, the isostatic strength can be effectively improved.

Figure 4:
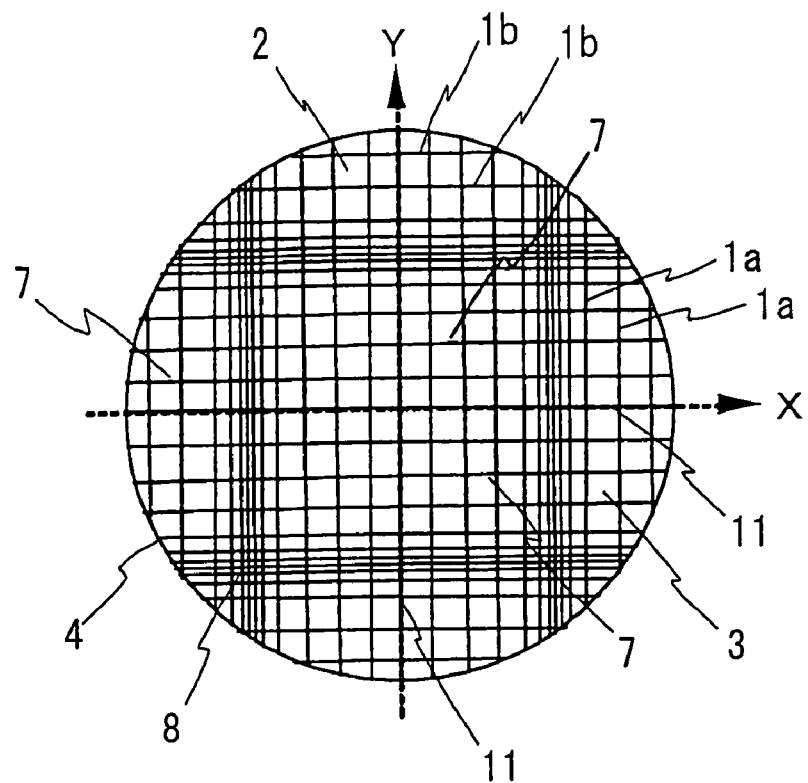
FIG. 4 is a cross-sectional view schematically showing another embodiment of a honeycomb structure of the present invention.
Figure 5:
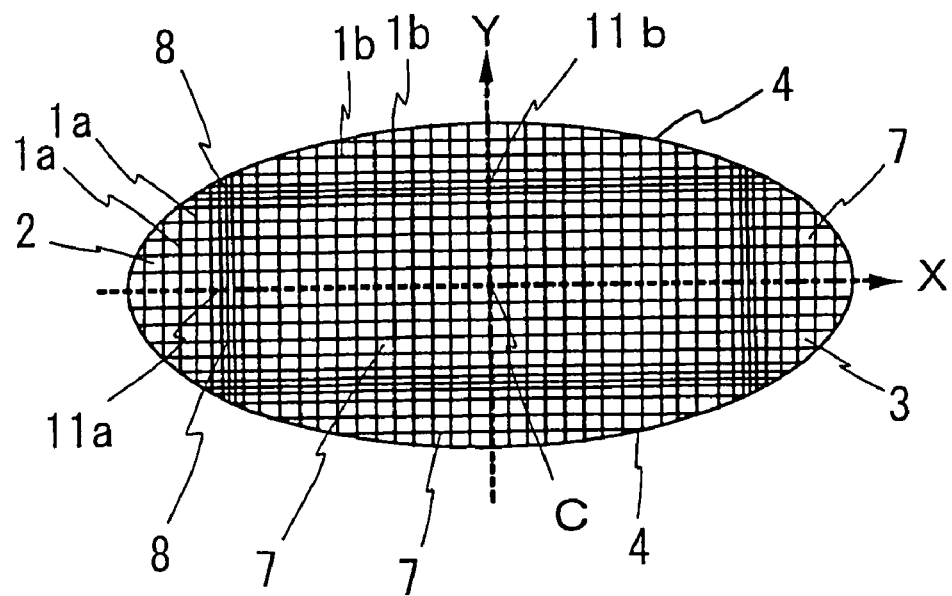
FIG. 5 is a cross-sectional view schematically showing another embodiment of a honeycomb structure of the present invention.

As a honeycomb structure of the same type, almost the same isostatic strength can be obtained by a honeycomb structure as shown in FIGS. 4 and 5 in which the partition wall intervals of the partition walls 1*a* of the first partition wall group and the partition walls 1*b* of the second partition wall group are decreased stepwise near each side of a tetragon (cross-sectional shape), which connects four locations of the outer circumferential wall section 4, and are increased in the remaining region to provide the high-cell-density region 8 near each side of the tetragonal cross-sectional shape and to provide the low-cell-density region 7 in the remaining region.

As a honeycomb structure of a type in which purification performance is improved by making the exhaust gas flow uniform while securing isostatic strength, a honeycomb structure as shown in FIGS. 6(*a*) and 6(*b*) or FIGS. 7(*a*) and 7(*b*) can be given in which the partition walls 1*a* and 1*b* of the first partition wall group and the second partition wall group are disposed at large partition wall intervals in a predetermined range from the outer circumference, and the partition wall intervals of the partition walls 1*a* and 1*b* of each partition wall group are decreased stepwise near the diameter positions 11 (major axis position 11*a* and minor axis position 11*b*) to provide the high-cell-density region 8 in which the partition wall intervals are varied stepwise in the cross-shaped region including the center section and to provide the low-cell-density region 7 between the high-cell-density regions 8 in the outer circumferential section.

In this honeycomb structure, since the cell density is increased in the center section, the catalyst contact area or filtration area of exhaust gas is increased, whereby the purification performance can be improved in a use mode in which exhaust gas is concentrated at the center section. Moreover, since the open frontal area of each cell located in the center section is small, exhaust gas easily flows into the cells located in the outer circumferential section, whereby the entire partition walls or catalyst can be caused to function effectively. Furthermore, since the high-cell-density region 8 is provided at four locations of the outer circumferential section, desired isostatic strength can be secured. As shown in FIGS. 7(*a*) and 7(*b*), cells having a rectangular cross-sectional shape can be provided at a high percentage by providing the partition walls 1*a* of the first partition wall group and the partition walls 1*b* of the second partition wall group at intervals of different sizes, whereby thermal shock resistance can be improved.

As a honeycomb structure of the same type, a honeycomb structure having an elliptical cross-sectional shape as shown in FIG. 8 can be given in which all the partition walls 1*b* of the second partition wall group are disposed at equal partition wall intervals, and the partition wall intervals of the partition walls 1*a* of the first partition wall group are decreased stepwise near the minor axis position 11*b* to provide the high-cell-density region 8 in the center section and the outer circumferential section near the outer circumference having a large radius of curvature and to provide the low-cell-density region 7 formed by the cell structure section 3 having equal partition wall intervals on each side of the high-cell-density region 8. In this honeycomb structure, the vicinity of the outer circumference having a large radius of curvature at which the external pressure during canning of the honeycomb structure tends to be increased can be intensively reinforced, and the exhaust gas flow rate is increased near the outer circumference having a small radius of curvature in which the exhaust gas flow rate tends to be decreased, whereby the exhaust gas flow rate can be made uniform over the entire honeycomb structure.

As a honeycomb structure of the same type having an elliptical cross-sectional shape, a honeycomb structure as shown in FIG. 9 can be given in which the partition walls 1a of the first partition wall group are disposed at large partition wall intervals in a predetermined region from the outer circumference and the partition wall intervals are decreased stepwise toward the minor axis position 11b, and the partition walls 1b of the second partition wall group are disposed at large partition wall intervals near the major axis position 11a and the partition wall intervals are decreased stepwise toward the outer circumference near the outer circumferential wall section 4 to provide the high-cell-density region 8 having a particularly high cell density near the outer circumference having a large radius of curvature, to provide the high-cell-density region 8 in the region including the center section, and to provide the low-cell-density region 7 in the remaining region. This honeycomb structure is preferable when higher isostatic strength is required in comparison with the honeycomb structure shown in FIG. 7.

In the honeycomb structure of the present invention, the partition wall intervals are varied in at least a part of the cell structure section. The partition wall intervals may be varied in the entire cell structure section, or may be varied in only a part of the cell structure section. However, it is also preferable that the partition walls provided in the low-cell-density region be disposed at equal partition wall intervals as in the honeycomb structures shown in FIGS. 1(*a*) and 1(*b*) to FIGS. 9(*a*) and 9(*b*), since the catalyst contact area or the filtration area is not decreased to a large extent, whereby desired exhaust gas purification performance can be secured.

In the present invention, there are no specific limitations as to the degree of change in the partition wall interval in the region in which the partition wall intervals are varied. However, it is preferable that the partition wall intervals be varied geometrically or arithmetically. If the partition wall intervals are locally and rapidly varied, since the cell rigidity is rapidly varied in that area, mechanical shock or thermal shock tends to be concentrated in that area, whereby isostatic strength and thermal shock resistance tends to be decreased.

Figure 10:
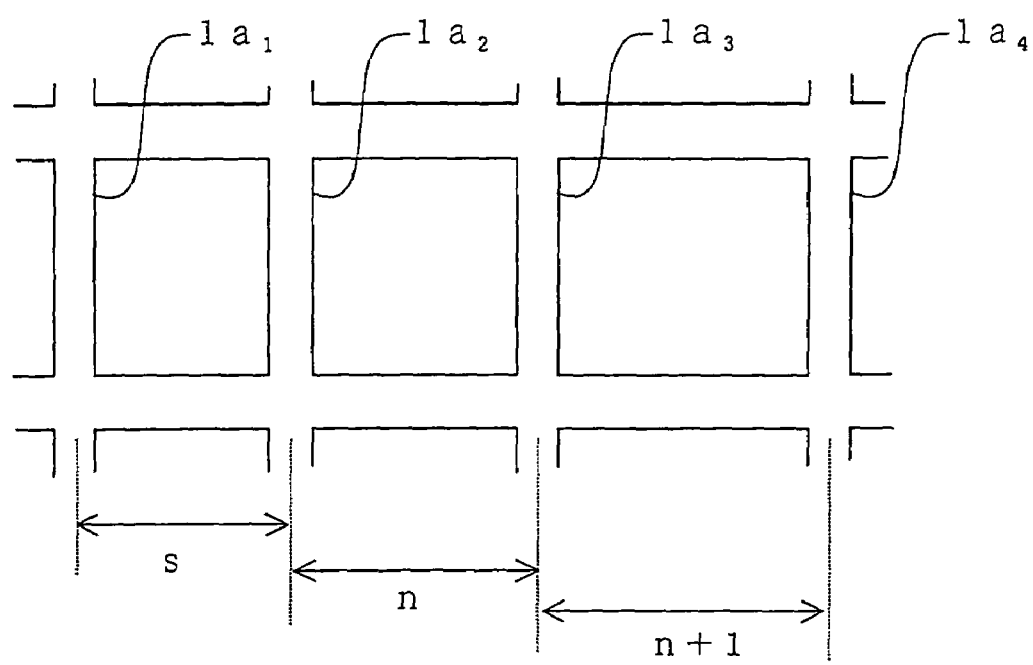
FIG. 10 is a partial top view illustrative of a reference partition wall interval and a next partition wall interval of a honeycomb structure of the present invention.
Figure 11:
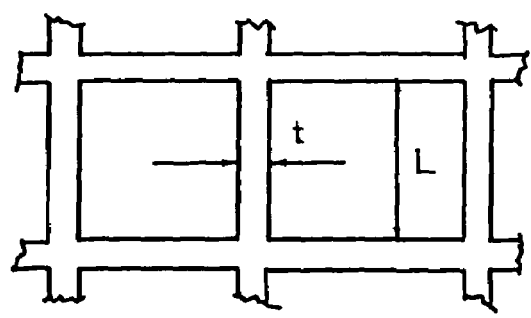
FIG. 11 is a partial cross-sectional view illustrative of the wall thickness and the cell side length of a honeycomb structure of the present invention.

In the present invention, it is preferable that the partition wall interval variation ratio (|next partition wall interval— reference partition wall interval|/reference partition wall interval) be 0.5 or less in the region in which the partition wall intervals are varied from the above-described point of view. When the interval between arbitrary adjacent partition walls is the "reference partition wall interval", the "next partition wall interval" used herein means the interval between the next adjacent partition walls. For example, when the reference partition wall interval is an interval (s) between a partition wall $1a_1$ and a partition wall $1a_2$ in FIG. 10, the next partition wall interval is an interval (n) between a partition wall $1a_2$ and a partition wall $1a_3$. When the reference interval is the interval (n), an interval (n+1) between the partition wall $1a_3$ and a partition wall $1a_4$ adjacent to the partition wall $1a_3$ is the next partition wall interval.

In the honeycomb structure of the present invention, it is preferable that a ratio of a cell side length (length of each side of a cell) L to a partition wall thickness (t) (cell side length (L)/partition wall thickness (t); hereinafter referred to as "length/thickness ratio") of all the partition walls be a value which allows the partition wall to withstand the pressure during canning while varying the partition wall intervals. In more detail, in order to increase the isostatic strength of the honeycomb structure by increasing the bending strength of the cells, it is preferable to increase the partition wall thickness (t) of the partition wall having a large cell side length (L) as in the low-density region or the like corresponding to the cell side length. In more detail, it is preferable that the square of the length/thickness ratio not exceed 1000, and it is still more preferable that the square of the length/thickness ratio not exceed 700.

It is also preferable to densify the partition wall having a large cell side length (L) by decreasing the porosity in order to increase the isostatic strength without causing an increase in pressure loss. However, since the heat capacity is increased by densification, it is still more preferable to adjust the porosity within an appropriate range.

A conventional partition wall formed of a cordierite material may be densified by causing a material including some of the components of the cordierite material to adhere to the partition wall and causing melting to occur during firing due to a decrease in melting point, for example.

In the present invention, in each of the honeycomb structures of the types shown in FIGS. 1(*a*) and 1(*b*) to FIGS. 9(*a*) and 9(*b*), it is preferable that the number of cells having a rectangular cross-sectional shape be large, since the thermal shock resistance is increased and the catalytic performance or adsorption performance can be improved. It is preferable that the cell 2 located in the outer circumferential section of the honeycomb structure have a flattening ratio (long side length/ short side length) of 2 or less, and still more preferably 1.2 or less.

If the flattening ratio (long side length/short side length) of the cell 2 located in the outer circumferential section is within this range, the bending strength of the cell structure section 3 located in the outer circumferential section can be improved, whereby desired isostatic strength of the honeycomb structure can be obtained. Therefore, it is also preferable that the cell 2 located in the outer circumferential section have a regular square cross-sectional shape.

Even if the flattening ratio (long side length/short side length) of the cell exceeds 1.2, the strength of the partition wall can be sufficiently secured when the flattening ratio is 2.0 or less by increasing the thickness of the partition wall or densifying the partition wall. However, since the heat capacity or pressure loss is increased if such measures are taken to a considerable extent, it is particularly preferable that the flattening ratio (long side length/short side length) of the cell be 1.2 or less.

In the present invention, as materials for forming the partition wall and the outer circumferential wall, a metal material, or at least one ceramic material selected from the group consisting of cordierite, alumina, mullite, lithium aluminum silicate, aluminum titanate, titania, zirconia, silicon nitride, aluminum nitride, and silicon carbide, or at least one adsorbent material such as activated carbon, silica gel, or zeolite can be given.

The shape of the honeycomb structure of the present invention is not particularly limited. For example, the cross-sectional shape of the honeycomb structure may be circular, elliptical, oval, or a non-symmetrical irregular shape.

The honeycomb structure of the present invention is described above. The honeycomb structure may be formed into a honeycomb filter by alternately plugging end faces of the cells using a plugging material formed of the same material as the material for the honeycomb structure, for example.

A catalyst body or an adsorbent may be formed by loading a catalyst such as Pt, Pd, or Rh on the partition walls of the honeycomb structure.

An exhaust gas purification converter may be formed by holding the honeycomb structure, the honeycomb filter, or the catalyst body in a casing, and providing an exhaust gas introduction tube for introducing exhaust gas into the honeycomb structure or the like.

A die suitably used to manufacture the above-described honeycomb structure of the present invention is described below.

Figure 12:
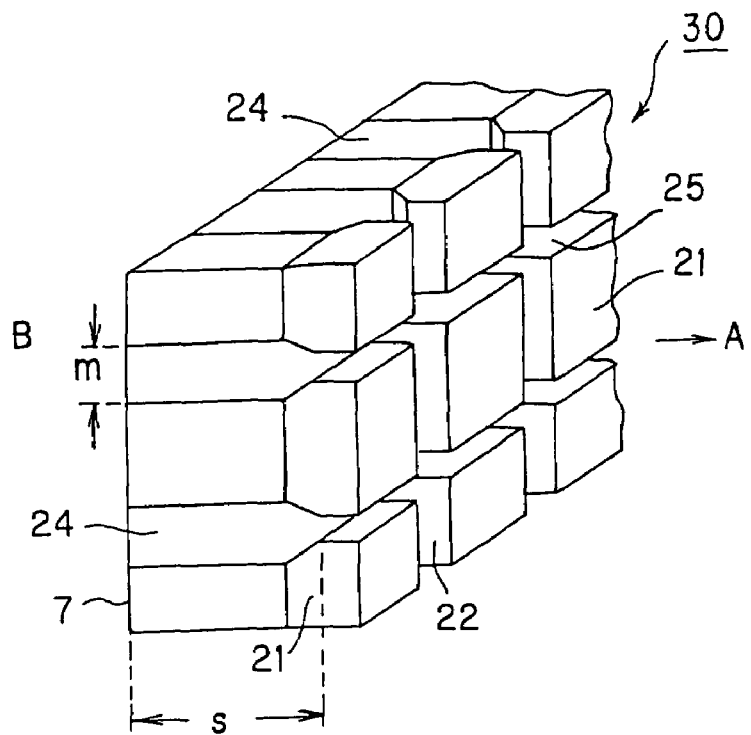
FIG. 12 is a partial perspective view schematically showing an embodiment of a die for forming a honeycomb structure of the present invention.
Figure 13:
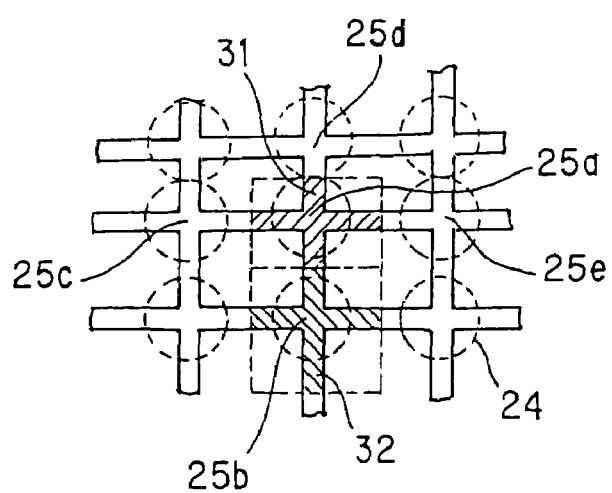
FIG. 13 is a partial front view illustrative of an open slit area of a die for forming a honeycomb structure of the present invention.

As shown in FIG. 12 or 13, a die 30 of the present invention includes lattice-shaped slits 22 which are open on one face A of a die substrate 21, and a plurality of holes 24 which are open on an opposite face B of the die substrate 21, each of the holes introducing a raw material into a specific region of the lattice-shaped slits 22, wherein open slit areas per unit lattice are varied stepwise in at least some of the lattice-shaped slits 22, the die 30 including a structure which varies flow rates of the raw material introduced into regions having different open slit areas per unit lattice at a ratio almost equal to a variation ratio of the open slit areas.

This enables the extrusion speed to be made uniform in the area in which the partition wall interval is small and the area in which the partition wall interval is large even in a honeycomb structure in which the partition wall intervals are varied, whereby the honeycomb structure of the present invention can be manufactured without causing a forming failure.

In the present invention, there are no specific limitations as to the formation positions of the holes 24. As shown in FIG. 12 or 13, the holes 24 are usually formed in the die for forming a honeycomb structure so that each of the holes 24 communicates with each intersection 25 of the lattice-shaped slits 22. In such a die 30, it is preferable that, at a ratio almost equal to a variation ratio of an open slit area 30 with a central point on one intersection 25a of the lattice-shaped slits and an open slit area 31 with a central point on the next intersection 25b adjacent to the one intersection 25a (open slit area 31/open slit area 30), the flow rate of the raw material introduced into the next intersection 25b be varied from the flow rate of the raw material introduced into the one intersection 25a.

The "open slit area with a central point on the intersection" used herein means the area of the slit opening in the range which starts from the one intersection 25a and ends at the midpoint of a straight line which connects the one intersection 25a with each of the adjacent intersections 25b to 25e, as shown in FIG. 13 (indicated by right-slanting lines in the drawing).

In the present invention, as the structure which varies the flow rates of the raw material introduced into the regions having different open slit areas per unit lattice corresponding to the variation ratio of the open slit areas (in the die shown in FIG. 12, the structure which, corresponding to the variation ratio, to the open slit area with a central point on one intersection of the lattice-shaped slits, of the open slit area with a central point on the next intersection adjacent to the one intersection, varies the flow rate of the raw material introduced into the next intersection from the flow rate of the raw material introduced into the one intersection), a structure in which at least one of intervals of the holes 24, inner diameters "m" of the holes 24, and raw material path lengths "s" of the holes 24 is varied can be given, for example.

In the present invention, a die in which the inner diameters "m" of the holes 24 or the raw material path lengths "s" of the holes 24 are varied is preferable, since it is possible to flexibly deal with a comparatively small change in the open slit area by simply changing the structure. In the case of manufacturing a honeycomb structure in which the partition wall intervals are varied significantly, a die in which the intervals of the holes 24 are varied is preferable.

However, it is preferable to combine at least the mode in which the inner diameters "m" of the holes 24 are varied and the mode in which the raw material path lengths "s" of the holes 24 are varied, since it becomes possible to flexibly deal with variations in the partition wall interval of the honeycomb structure. It is still more preferable to further combine the mode in which the intervals of the holes 24 are varied.

Figure 14A:
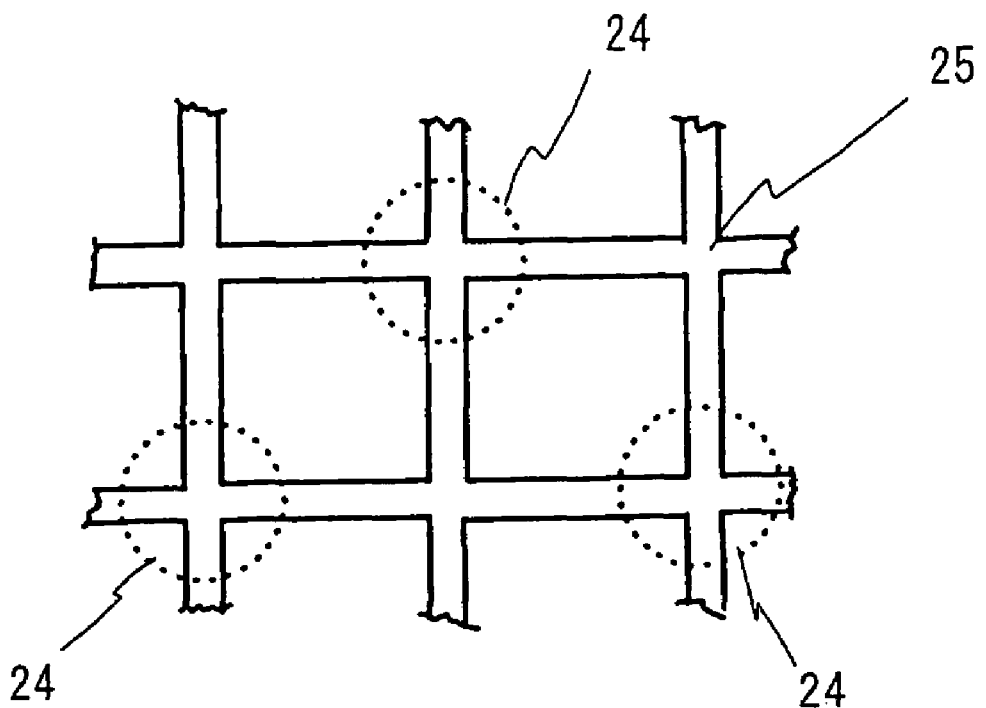
FIG. 14(a) is a partial front view illustrative of positions of holes in a die for forming a honeycomb structure of the present invention in the area in which the slit intervals are large.
Figure 14B:
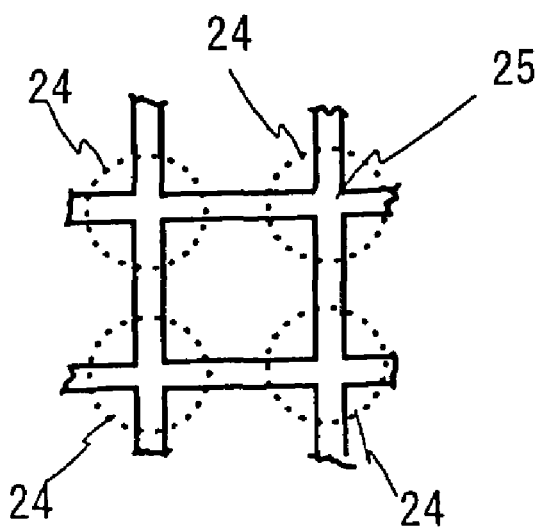
FIG. 14(b) is a partial front view illustrative of positions of holes in a die for forming a honeycomb structure of the present invention in the area in which the slit intervals are small.

In the present invention, a die may be provided in which the intervals of the holes are varied corresponding to the variation ratio of the open slit areas, such as a die in which the holes 24 are provided to every other intersection 25 in the slit section corresponding to the partition walls present in the low-cell-density region shown in FIG. 14(a) in which the partition wall intervals are large, and the holes 24 are provided to all the intersections 25 in the slit section corresponding to the partition walls present in the high-cell-density region shown in FIG. 14(b) in which the partition wall intervals are small.

In the present invention, in a die in which the inner diameters of the holes 24 are varied or a die in which the raw material path lengths of the holes are varied, it is preferable to appropriately set the inner diameters "m" or the raw material path lengths "s" of the holes 24 corresponding to the raw material pressure applied to the holes 24, the slit width, or the like so that the raw material flow rate can be easily adjusted while preventing a considerable increase in the raw material pressure.

There are no specific limitations as to the remaining features of the die of the present invention. For example, the die forming material, the slit width, the manufacturing method, and the like may be selected from those usually selected.

EXAMPLE 1

Kneaded clay containing a cordierite-forming raw material as a major component was prepared according to a conventional method. The resulting clay was extruded using a die for forming a honeycomb structure having a shape as shown in FIG. 1(a), dried, and fired to prepare a honeycomb structure. The resulting honeycomb structure was in the shape of a column having a diameter of about 130 mm and a length of 150 mm, in which the porosity was 25%, the thickness of the outer circumference wall was 0.3 mm, and the partition wall thickness was 0.06 mm. The outermost circumferential partition wall interval (first) was set to 0.85 mm, the next adjacent partition wall interval (second) was set to 0.88 mm, and the partition wall intervals for 10 cells were sequentially varied geometrically. The subsequent partition wall interval was fixed at 1.27 mm. Table 1 shows the partition wall intervals and the like in the 10-cell region, specifically, in a partition wall interval change region 10 shown in FIG. 1(b), and the partition wall interval in a partition wall interval fixed region 9.

TABLE 1

|  | Partition wall interval (mm) | Partition wall interval variation ratio | Cell flattening ratio | (Cell side length/ partition wall thickness)$^2$ |
|---|---|---|---|---|
| Outermost circumferential partition walls (first) | 0.85 | 0.04 | 1.5 | 407 |
| Second | 0.88 | 0.04 | 1.4 | 407 |
| Third | 0.92 | 0.04 | 1.4 | 407 |
| Fourth | 0.96 | 0.04 | 1.3 | 407 |
| Fifth | 0.99 | 0.04 | 1.3 | 407 |
| Sixth | 1.03 | 0.04 | 1.2 | 407 |

TABLE 1-continued

|  | Partition wall interval (mm) | Partition wall interval variation ratio | Cell flattening ratio | (Cell side length/ partition wall thickness)$^2$ |
|---|---|---|---|---|
| Seventh | 1.08 | 0.04 | 1.2 | 407 |
| Eighth | 1.12 | 0.04 | 1.1 | 407 |
| Ninth | 1.16 | 0.04 | 1.1 | 407 |
| Tenth | 1.21 | 0.05 | 1.0 | 407 |
| Partition wall interval fixed region | 1.27 | | | |

EXAMPLES 2 AND 3 AND COMPARATIVE EXAMPLES 1 AND 2

A honeycomb structure was prepared in the same manner as in Example 1 except for changing the partition wall thickness as shown in Table 2.

TABLE 2

|  | Partition wall thickness (mm) | (Cell side length/ partition wall thickness)$^2$ | Isostatic fracture strength test result |
|---|---|---|---|
| Example 1 | 0.06 | 407 | Did not fracture |
| Example 2 | 0.05 | 595 | Did not fracture |
| Example 3 | 0.04 | 946 | Did not fracture |
| Comparative Example 1 | 0.035 | 1245 | Fractured |
| Comparative Example 2 | 0.03 | 1708 | Fractured |

The honeycomb structures obtained in Examples 1 to 3 and Comparative Examples 1 and 2 were subjected to an isostatic fracture strength test at a pressure of 0.5 MPa to observe the presence or absence of fracture. The results are shown in Table 2. The honeycomb structures of Examples 1 to 3 in which the square of (cell side length/partition wall thickness) was less than 1000 did not fracture during the isostatic fracture strength test and were confirmed to be able to withstand the pressure during canning. However, the honeycomb structures of Comparative Examples 1 and 2 in which the square of (cell side length/partition wall thickness) exceeded 1000 fractured during the isostatic fracture strength test and were confirmed to be not able to-withstand the pressure during canning.

EXAMPLES 4 AND 5 AND COMPARATIVE EXAMPLES 3 AND 4

A honeycomb structure was prepared in the same manner as in Example 1 except for changing the outermost circumferential partition wall interval as shown in Table 3 and changing the partition wall interval variation ratio corresponding to the outermost circumferential partition wall interval. The resulting honeycomb structure was subjected to the isostatic fracture strength test in the same manner as in Example 1 to observe the presence or absence of fracture. The results are shown in Table 3. The honeycomb structures of Examples 1, 4, and 5 in which the maximum value of the cell flattening ratio was 2.0 or less did not fracture and were confirmed to be able to withstand the pressure during canning. However, the honeycomb structures of Comparative Examples 3 and 4 in which the maximum value of the cell flattening ratio exceeded 2.0 fractured and were confirmed to be not able to withstand the pressure during canning.

TABLE 3

|  | Outermost circumferential partition wall interval (mm) | Cell flattening ratio (maximum value) | Isostatic fracture strength test result |
|---|---|---|---|
| Example 1 | 0.85 | 1.5 | Did not fracture |
| Example 4 | 0.70 | 1.8 | Did not fracture |
| Example 5 | 0.65 | 2.0 | Did not fracture |
| Comparative Example 3 | 0.60 | 2.1 | Fractured |
| Comparative Example 4 | 0.55 | 2.3 | Fractured |

EXAMPLES 6 TO 9

A honeycomb structure was prepared in the same manner as in Example 1 except for changing the outermost circumferential partition wall interval to 0.7 mm, changing the partition wall interval in the partition wall interval fixed region to 1.27 mm, and varying the partition wall intervals for two cells or three cells at a variation ratio shown in Table 4. The resulting honeycomb structure was subjected to a thermal shock test by heating the honeycomb structure at 800° C. for 30 minutes in an electric furnace and removing the honeycomb structure from the electric furnace to observe the presence or absence of fracture of the honeycomb structure. The results are shown in Table 4. In the case where the constitution of the honeycomb structure and the thermal shock condition were as described above, since the honeycomb structure of Example 9 having a region in which the partition wall interval variation ratio was 0.6 fractured, it was confirmed that it is preferable that the partition wall interval variation ratio be 0.5 or less.

TABLE 4

| Example | | Partition wall interval (mm) | Partition wall interval variation ratio | Cell flattening ratio | Electric furnace test result |
|---|---|---|---|---|---|
| 6 | Outermost circumferential partition walls (first) | 0.70 | 0.30 | 1.8 | Cracks did not occur |
|  | Second | 0.91 | 0.30 | 1.4 | |
|  | Third | 1.18 | 0.07 | 1.1 | |
|  | Partition wall interval fixed region | 1.27 | | | |

TABLE 4-continued

| Example | | Partition wall interval (mm) | Partition wall interval variation ratio | Cell flattening ratio | Electric furnace test result |
|---|---|---|---|---|---|
| 7 | Outermost circumferential partition walls (first) | 0.70 | 0.40 | 1.8 | Cracks did not occur |
| | Second | 0.98 | 0.30 | 1.4 | |
| | Partition wall interval fixed region | 1.27 | | | |
| 8 | Outermost circumferential partition walls (first) | 0.70 | 0.50 | 1.8 | Cracks did not occur |
| | Second | 1.05 | 0.21 | 1.4 | |
| | Partition wall interval fixed region | 1.27 | | | |
| 9 | Outermost circumferential partition walls (first) | 0.70 | 0.60 | 1.8 | Cracks occurred |
| | Second | 1.12 | 0.13 | 1.4 | |
| | Partition wall interval fixed region | 1.27 | | | |

EXAMPLE 10

A cordierite honeycomb structure was prepared in the same manner as in Example 1 except for changing the partition wall thickness to 0.05 mm, changing the outermost partition wall interval (first) to 0.7 mm, sequentially varying the partition wall intervals for nine cells geometrically at a variation ratio shown in Table 5, and changing the partition wall interval in the partition wall interval fixed region to 1.04 mm.

TABLE 5

| | Partition wall interval (mm) | Partition wall interval variation ratio | Cell flattening ratio | (Cell side length/ partition wall thickness)$^2$ |
|---|---|---|---|---|
| Outermost circumferential partition walls (first) | 0.73 | 0.04 | 1.4 | 392 |
| Second | 0.76 | 0.04 | 1.4 | 392 |
| Third | 0.79 | 0.04 | 1.3 | 392 |
| Fourth | 0.82 | 0.04 | 1.3 | 392 |
| Fifth | 0.85 | 0.04 | 1.2 | 392 |
| Sixth | 0.89 | 0.04 | 1.2 | 392 |
| Seventh | 0.92 | 0.04 | 1.1 | 392 |
| Eighth | 0.96 | 0.04 | 1.1 | 392 |
| Ninth | 1.00 | 0.04 | 1.0 | 392 |
| Partition wall interval fixed region | 1.04 | | | |

EXAMPLE 11

A cordierite honeycomb structure was prepared in the same manner as in Example 1 except for changing the partition wall thickness to 0.04 mm, changing the outermost partition wall interval (first) to 0.70 mm, sequentially varying the partition wall intervals for 10 cells geometrically at a variation ratio shown in Table 5, and changing the partition wall interval in the partition wall interval fixed region to 0.85 mm.

TABLE 6

| | Partition wall interval (mm) | Partition wall interval variation ratio | Cell flattening ratio | (Cell side length/ partition wall thickness)$^2$ |
|---|---|---|---|---|
| Outermost circumferential partition walls (first) | 0.70 | 0.02 | 1.2 | 410 |
| Second | 0.71 | 0.02 | 1.2 | 410 |
| Third | 0.73 | 0.02 | 1.2 | 410 |
| Fourth | 0.74 | 0.02 | 1.1 | 410 |
| Fifth | 0.76 | 0.02 | 1.1 | 410 |
| Sixth | 0.77 | 0.02 | 1.1 | 410 |
| Seventh | 0.79 | 0.02 | 1.1 | 410 |
| Eighth | 0.80 | 0.02 | 1.1 | 410 |
| Ninth | 0.82 | 0.02 | 1.0 | 410 |
| Tenth | 0.84 | 0.02 | 1.0 | 410 |
| Partition wall interval fixed region | 0.85 | | | |

EXAMPLE 12

A honeycomb structure was prepared in the same manner as in Example 1 except for changing the diameter to about 200 mm, changing the length to 170 mm, changing the porosity to 65%, changing the partition wall thickness to 0.3 mm, forming the outer circumference wall using a ceramic cement coat, alternately plugging the cells, changing the outermost partition wall interval (first) to 1.00 mm, sequentially varying the partition wall intervals for five cells geometrically, and changing the partition wall interval in the partition wall interval fixed region to 1.47 mm as shown in Table 7.

TABLE 7

| | Partition wall interval (mm) | Partition wall interval variation ratio | Cell flattening ratio | (Cell side length/ partition wall thickness)$^2$ |
|---|---|---|---|---|
| Outermost circumferential partition walls (first) | 1.00 | 0.10 | 1.5 | 15 |

TABLE 7-continued

|  | Partition wall interval (mm) | Partition wall interval variation ratio | Cell flattening ratio | (Cell side length/ partition wall thickness)$^2$ |
|---|---|---|---|---|
| Second | 1.10 | 0.10 | 1.3 | 15 |
| Third | 1.21 | 0.10 | 1.2 | 15 |
| Fourth | 1.33 | 0.10 | 1.1 | 15 |
| Fifth | 1.46 | 0.00 | 1.0 | 15 |
| Partition wall interval fixed region | 1.47 | | | |

EXAMPLE 13

A honeycomb structure was prepared in the same manner as in Example 12 except for changing the partition wall intervals for four cells from the outer circumference as shown in Table 8.

TABLE 8

|  | Partition wall interval (mm) | Partition wall interval variation ratio | Cell flattening ratio | (Cell side length/ partition wall thickness)$^2$ |
|---|---|---|---|---|
| Outermost circumferential partition walls (first) | 1.00 | 0.15 | 1.5 | 15 |
| Second | 1.15 | 0.15 | 1.3 | 15 |
| Third | 1.30 | 0.15 | 1.1 | 15 |
| Fourth | 1.45 | 0.02 | 1.0 | 15 |
| Partition wall interval fixed region | 1.47 | | | |

The honeycomb structures obtained in Examples 10 to 13 were subjected to the isostatic fracture strength test at a pressure of 0.5 MPa to observe the presence or absence of fracture. As a result, since these honeycomb structures did not fracture, it was confirmed that these honeycomb structures can withstand the pressure during canning.

INDUSTRIAL APPLICABILITY

According to the present invention, a honeycomb structure which excels in isostatic strength and thermal shock resistance and has such a high industrial applicability that the honeycomb structure can be manufactured at low cost can be provided. According to the present invention, a die for forming a honeycomb structure which enables such a honeycomb structure to be manufactured without causing a forming failure can be provided.

The invention claimed is:

1. A honeycomb structure, comprising:
    a cell structure section including a plurality of cells partitioned by a plurality of partition walls; and
    an outer circumferential wall section surrounding the cell structure section;
    wherein the cell structure section includes a first partition wall group having the partition walls positioned in parallel, and a second partition wall group having the partition walls which intersect the partition walls of the first partition wall group at right angles and are positioned in parallel, each of the partition walls connecting two different locations of the outer circumferential wall section through one continuous plane;
    wherein partition wall intervals of each of the partition wall groups positioned in parallel are varied stepwise in at least a part of the cell structure section, and at least some of the plurality of cells have a rectangular cross-sectional shape; and
    wherein all the partition walls have such a ratio of a cell side length to a partition wall thickness that the partition wall can withstand pressure during canning.

2. The honeycomb structure according to claim 1, wherein a square of the ratio is 1,000 or less.

3. The honeycomb structure according to claim 1, wherein a flattening ratio of the long side length to the short side length of the cells in the cell structure section is 2.0 or less.

4. The honeycomb structure according to claim 1, wherein the partition wall intervals of the first partition wall group are varied at a different pattern or size relative to the partition wall intervals of the second partition wall group.

5. The honeycomb structure according to claim 1, wherein the partition wall intervals are varied geometrically in a region in which the partition wall intervals are varied stepwise.

6. The honeycomb structure according to claim 1, wherein the partition wall intervals are varied arithmetically in a region in which the partition wall intervals are varied stepwise.

7. The honeycomb structure according to claim 1, wherein a partition wall interval variation ratio is 0.5 or less in a region in which the partition wall intervals are varied stepwise, the partition wall interval variation ratio being an absolute value of a difference between a next partition wall interval and a reference partition wall interval to the reference partition wall interval.

8. The honeycomb structure according to claim 1, wherein the cells are alternately plugged on either end face.

9. The honeycomb structure according to claim 1, wherein a catalyst component is loaded on a surface and/or inside of the partition wall.

10. The honeycomb structure according to claim 1, wherein an adsorbent component is loaded on a surface and/or inside of the partition wall.

11. The honeycomb structure according to claim 1, wherein a catalyst component and an adsorbent component are loaded on a surface and/or inside of the partition wall.

12. An exhaust gas purification converter, comprising the honeycomb structure according to claim 1.

* * * * *